United States Patent
Burdgick et al.

(10) Patent No.: US 7,422,415 B2
(45) Date of Patent: Sep. 9, 2008

(54) AIRFOIL AND METHOD FOR MOISTURE REMOVAL AND STEAM INJECTION

(75) Inventors: Steven Sebastian Burdgick, Schenectady, NY (US); Boris Ivanovitch Frolov, Kharkov (UA)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 11/438,251

(22) Filed: May 23, 2006

(65) Prior Publication Data

US 2007/0274824 A1 Nov. 29, 2007

(51) Int. Cl.
*F03B 11/00* (2006.01)
(52) U.S. Cl. ............... 415/1; 415/169.1; 415/169.2
(58) Field of Classification Search ............ 415/1, 415/169.1, 169.2, 169.3, 169.4
See application file for complete search history.

(56) References Cited

U.S. PATENT DOCUMENTS

| | | | |
|---|---|---|---|
| 2,362,831 A * | 11/1944 | Kraft | 415/169.3 |
| 3,306,575 A * | 2/1967 | Frankel | 415/169.2 |
| 3,881,842 A | 5/1975 | Kosyak et al. | |
| 5,261,785 A | 11/1993 | Williams | |
| 6,305,902 B1 * | 10/2001 | Konishi et al. | 415/115 |
| 6,474,942 B2 | 11/2002 | Markytan | |

FOREIGN PATENT DOCUMENTS

JP 01045904 A * 2/1989

OTHER PUBLICATIONS

Fadeev I.P.; "Erosion in wet steam Turbines" (ФадеевИ.П., "Эрозиявлажнопаровыхтурбин"), "МашиносТроение", Book published in Russia; 1974; p. 141 and p. 152.
Troyanovsky, et al; "Latest Developments in Steam Turbine Low Pressure Cylinders and Last Stages"; The Moscow Power Institute (State University); 2002; 3 pages; Fig. 9.3 excerpted from Sakuma et al., "Upgrading and life Extension Technologies for Existing Steam Turbines", (Toshiba Co.), Oct. 2001. p. 832-837.

* cited by examiner

*Primary Examiner*—Igor Kershteyn
(74) *Attorney, Agent, or Firm*—Nixon & Vanderhye PC

(57) ABSTRACT

An airfoil configured for removing moisture from the steam flow path and injecting steam into the steam flow path of a steam turbine.

20 Claims, 5 Drawing Sheets

AIRFOIL AND METHOD FOR MOISTURE REMOVAL AND STEAM INJECTION

BACKGROUND OF THE INVENTION

In the case of wet steam, both steam-borne, or primary, moisture and moisture deposited on the internal metal surfaces of the steam path, i.e., secondary moisture, cause efficiency losses and the potential for erosion.

The water accumulation on diaphragm surfaces is a complex process which is different for different surfaces. In the context of a steam turbine, a "stage" is comprised of and defined as two rows of airfoils; one stationary and the other rotating with the rotating rows of airfoils disposed downstream of the stationary row of airfoils. For diaphragm outer side walls and airfoils (nozzles) the main driver for water accumulation is centrifugal forces which push water droplets from previous rotating buckets outward. As a result of a large incidence angle between moisture droplets and nozzle leading edges, most of the water deposits (impacts) on the forward portion of the nozzle suction side (convex surface) nearest to the leading edge. As for nozzle pressure side surface, the water accumulation takes place all along the channel (FIG. 3) due to centrifugal forces acting on coarse water and the nearer to the trailing edge, the more water is accumulated on this surface. The accumulated water on the outer side wall and nozzles flows downstream toward the rotating buckets, thus increasing the risk of erosion.

The path of deposited moisture in a steam turbine stage may be tracked as follows. The moisture starts out as either primary moisture or secondary moisture that is carried over from the previous stage or stages of the turbine. With reference to FIGS. 1 and 3, the moisture, shown generally at 10 in FIG. 3, is deposited on the pressure or concave side 12 of the stationary airfoil 14. The moisture is driven by the steam to the stationary airfoil trailing edge 16. The moisture is torn off from there in the form of clusters of water which move in the same direction as but slower than the steam, in the wake behind the stationary airfoils 14. The moisture is then atomized as the relative velocity between it and the surrounding steam reaches a certain threshold. At this point, the moisture is significantly increased in its rate of acceleration while still moving slower than the surrounding steam. This moisture, shown generally at 18 in FIG. 1, impacts the rotating airfoil leading edge 22. In this Figure, W is the bucket rotational speed and $V_{WB}$ is the water velocity relative to the bucket.

Referring to FIG. 2, conventionally a number of radial grooves 24 (typically 3) may be located on a rotating airfoil 20 suction or convex side 26 close to the airfoil leading edge 22 for removing the moisture 18 impacted therein. The disadvantage of grooves 24 is that they only remove moisture that has already caused significant efficiency losses. Indeed, efficiency losses of various kinds are realized when the moisture 10 is first deposited on the stationary airfoil pressure side 12 up to and including moisture 18 interception by the rotating leading edge 22.

In some last stages of steam turbines, due to high speed and high local wetness values, erosion in the tip region is a common occurrence unless protective measures are taken. In general the above described mechanism of moisture accumulation on blade surfaces is well accepted and this concept is the baseline for many moisture removal designs in steam turbines' last stages. Manufacturers generally harden the bucket leading edges near this region or shield them with satellite strips. Other protective measures include removal of water through water drainage arrangements in the nozzle outer side walls (end walls) or through suction slots made in hollow stator blades (airfoils or nozzles). This moisture is then collected in circumferential cavities between the diaphragm and the casing and drains to the condenser.

Previous concepts of moisture removal through the blades are based on extraction of moisture film from blade surfaces through slots due to the pressure difference (drop) between the steam path and the hollow blade inner space. Collected moisture in the diaphragm outer/inner rings is then drained ultimately to the condenser. Thus, this prior art consists of providing a hollow diaphragm structure with extraction slot/bores located on the suction side of the airfoil and connected to outer/inner ring chambers that drain to the condenser.

Existing hollow blade extraction slot/bore designs provide moisture removal and thus perform a positive function. However, this moisture evacuation process can work effectively only under sufficient pressure drop, which simultaneously evacuates a significant amount of steam from the steam path to the condenser, thus reducing steam turbine efficiency. Typical values of stream leakage are 0.5-0.8% of main steam. This leakage proportionally reduces steam turbine efficiency.

Another concept to reduce the risk of erosion is based on the fact that water droplets of smaller size cause less erosion than bigger ones. According to this concept, steam is ejected from hollow blade slots to push away the moisture film from the blade surface and at the same time break-up/fragment big water droplets into smaller ones. Conventionally, according to this concept, the steam ejecting slot is positioned as close to the trailing edge as possible.

BRIEF DESCRIPTION OF THE INVENTION

The invention provides an airfoil and method to reduce the moisture, in particular in the steam turbine last stages, which creates erosion issues for the last stage(s) buckets. More particularly, the invention improves stage efficiency by effectively removing moisture from the steampath and/or reducing droplet size. In example embodiments of the invention this is achieved by using both moisture removal bore(s), to extract moisture from the nozzle surface, and steam injection bore(s), to return at least some of the steam that escapes through the moisture removal bores and/or to push moisture away from the airfoil surface, thus fragmenting coarse water droplets into smaller size.

Thus, the invention may be embodied in an airfoil disposed in a row of airfoils in a steam turbine for removing moisture from a flow path of the steam turbine, wherein the airfoil has first and second longitudinal ends and an outer peripheral wall extending therebetween, said outer peripheral wall defining an airfoil leading edge, an airfoil trailing edge, a generally concave side face and a generally convex side face, at least one moisture extraction bore defined to extend along a portion of the length of said airfoil and having at least one inlet opening in flow communication with a steam path extending passed said airfoil row and between adjacent airfoils, and at least one steam injection bore defined to extend along a portion of the length of said airfoil axially downstream of at least one said moisture extraction bore and including at least one exit opening for steam injection into said steam path.

The invention may also be embodied in a method for removing moisture from a flow path of the steam turbine, comprising: providing at least one moisture removing airfoil in a row of airfoils of the steam turbine, the moisture removing airfoil having first and second longitudinal ends and an outer peripheral wall extending therebetween, said outer peripheral wall defining an airfoil leading edge, an airfoil trailing edge, a generally concave side face and a generally convex side face, at least one moisture extraction bore defined to extend along a portion of the length of said airfoil and having at least one inlet opening in flow communication with a steam path extending passed said airfoil row and between adjacent airfoils, and at least one steam injection bore defined to extend along a portion of the length of said airfoil axially downstream of at least one said moisture extraction bore and including at least one exit opening for steam injection into said steam path; extracting moisture from a surface of said airfoil through said at least one moisture extraction bore; and injecting steam through said at least one steam injection bore into said steam path.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Moisture removal is needed for two basic reasons. The first reason is to remove moisture (or reduce the water droplet size) to lessen the risk of erosion, particularly on the last stage buckets. This erosion lowers the bucket reliability and can reduce the stage performance. The second reason to remove moisture is to improve the stage efficiency by improving the vector diaphragm reaction between the bucket and nozzle due to the losses in the moisture momentum and trajectory.

The present invention provides a structure and method to reduce the moisture in a steam turbine stage, particularly in the steam turbine last stages so as to reduce erosion issues for the buckets of those stage(s). Additionally, the invention provides an airfoil configuration and method to improve steam turbine performance by removing moisture from the steam path, thereby improving stage efficiency. In particular, the invention proposes an airfoil configuration and method that improves moisture removal effectiveness.

In an example embodiment of the invention, the effectiveness of moisture removal is improved with a diaphragm design that provides for both moisture removal and steam injection. The moisture removal is via at least one bore to extract moisture film from the nozzle surface. The steam injection is via at least one steam injection bore. The steam injection serves to push moisture away from the surface of the nozzle and, thus, fragments coarse water droplets into smaller sizes. In an example embodiment, furthermore, the injected steam is comprised of steam flowing out of the steam path into the moisture removal bore(s), so that the stem injection saves much of the steam that would typically go to the condenser if only moisture removal bore(s) were provided. The combination of moisture removal bore(s) and steam injection reduces the risk of rotating bucket erosion and improves the steam turbine reliability. Efficiency is improved not only by the removal of moisture but by returning steam, which inevitably leaks through the moisture extraction bore(s), via steam injection.

Thus, while the invention is directed to solving the problem of moisture removal, and thus reduces the risk of bucket erosion, the invention further and advantageously minimizes steam efficiency drop due to steam leakage/evacuation from the steam path. In addition, the steam injection according to an example embodiment of the invention improves stage efficiency by reducing moisture droplet size.

Figure 1:
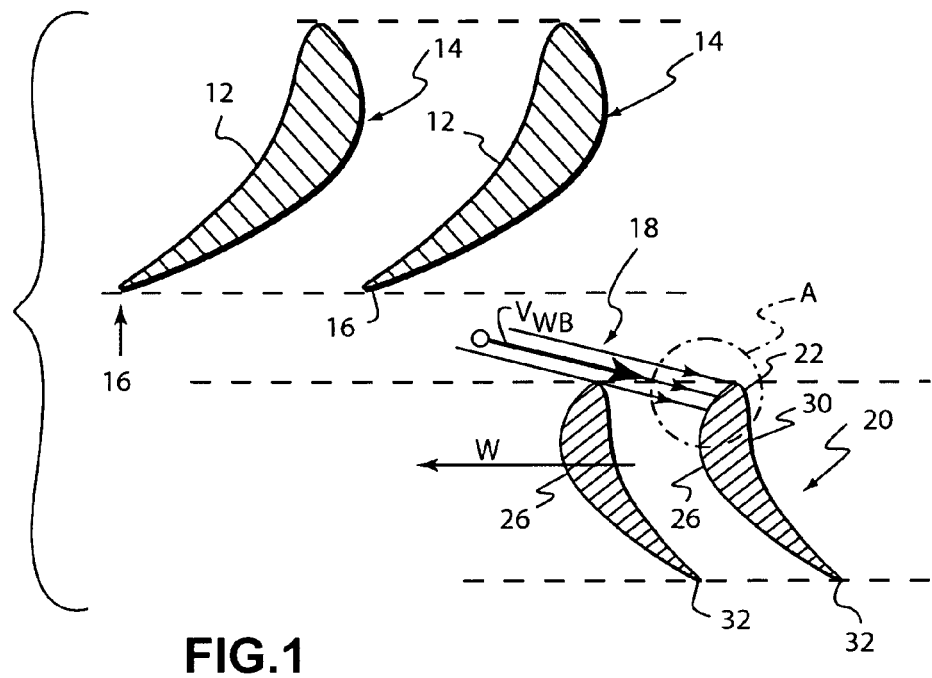
FIG. 1 is a schematic cross-sectional view of a portion of a turbine stage showing steam and moisture flow therethrough.
Figure 2:
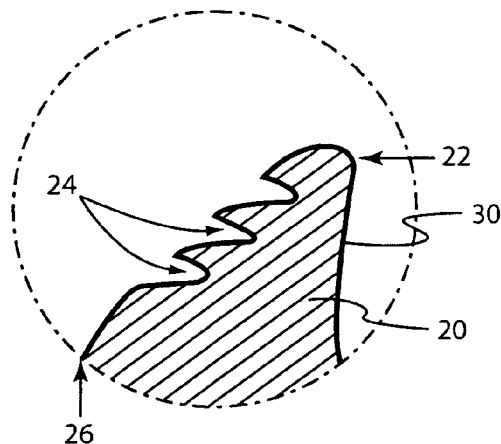
FIG. 2 is an enlarged schematic cross-sectional view corresponding to detail A in FIG. 1.
Figure 3:
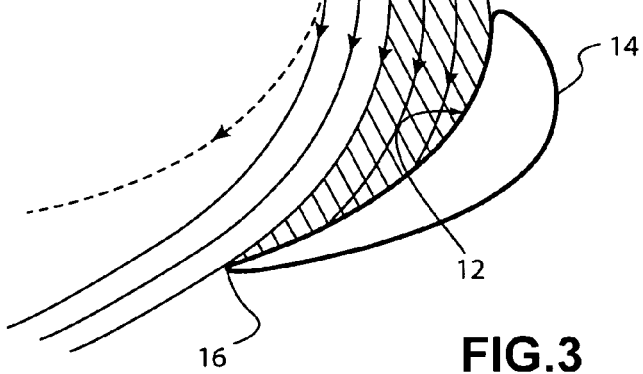
FIG. 3 is a schematic cross-sectional view from above showing droplet travel just before deposition on a stationary airfoil pressure side.
Figure 4:
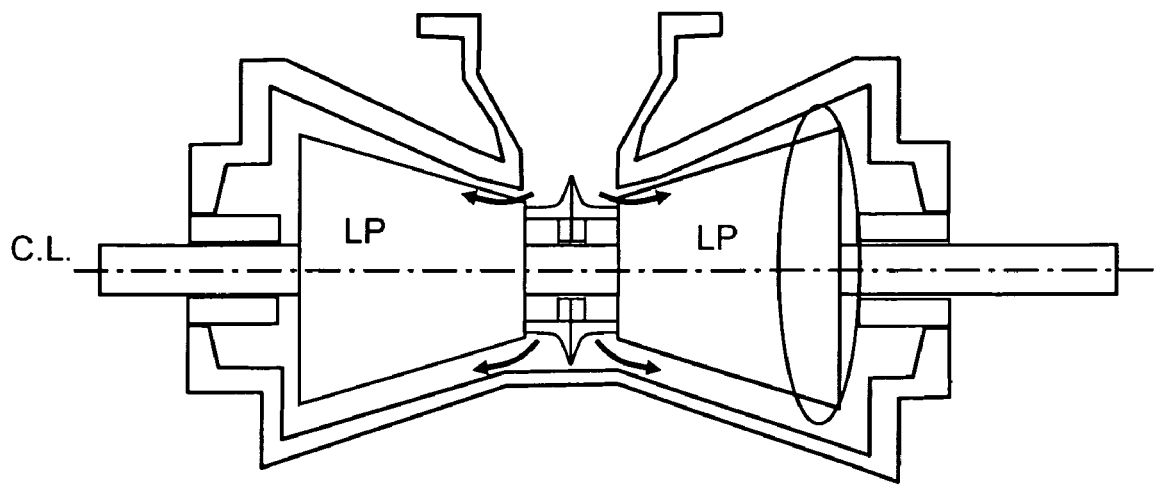
FIG. 4 is a schematic side view of a typical 2-flow low pressure (LP) steam turbine illustrating the location of the last stage diaphragms.
Figure 5:
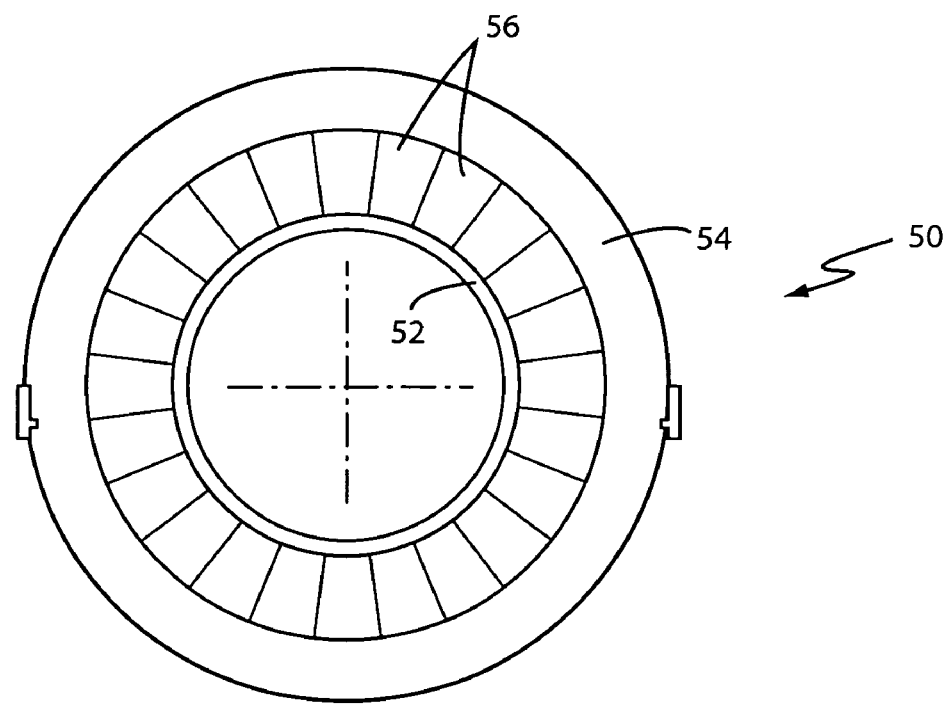
FIG. 5 is a front view of a typical diaphragm assembly.
Figure 6:
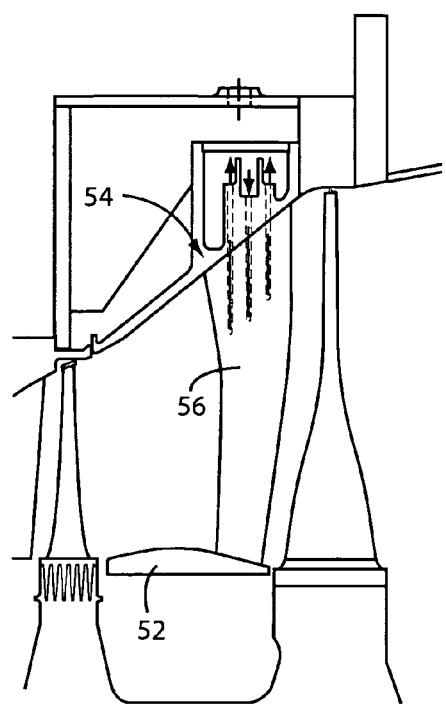
FIG. 6 is a schematic illustration of moisture removal in an example embodiment of the invention.
Figure 7:
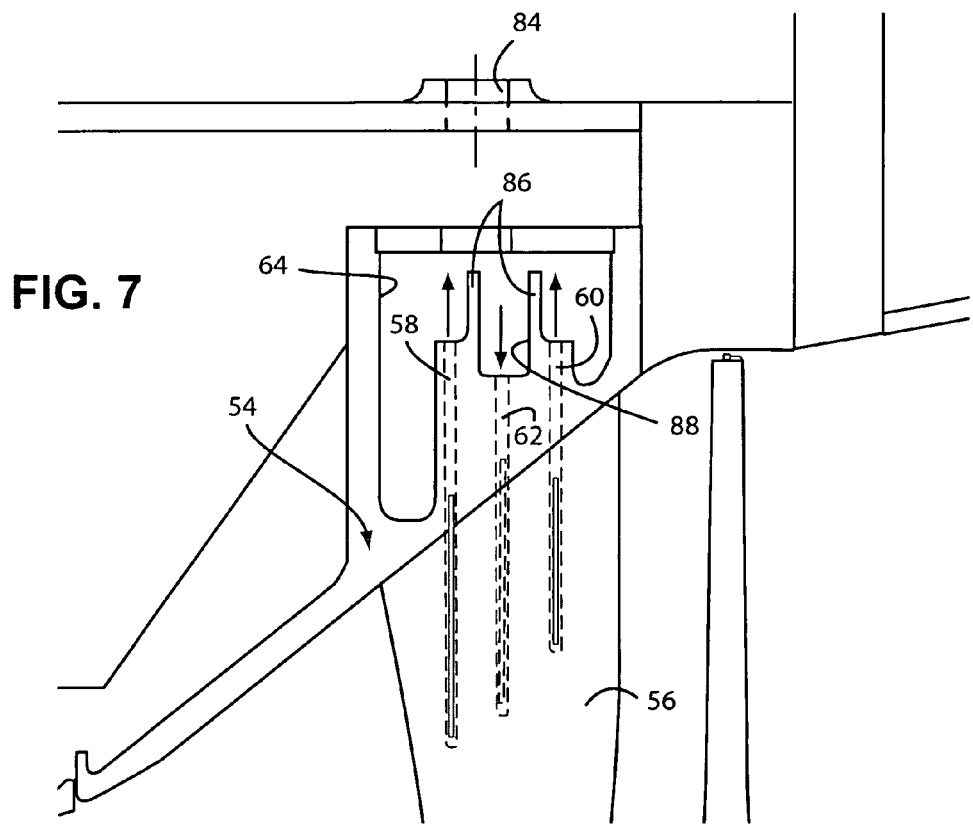
FIG. 7 is a more detailed illustration of moisture removal according to the FIG. 6 embodiment.

FIG. 4 schematically illustrates a typical 2-flow low pressure (LP) turbine section, and FIG. 5 schematically illustrates a typical diaphragm stage. FIG. 6 is a schematic cross-section of a diaphragm stage, illustrating a moisture removal concept embodying the invention, whereas FIG. 7 is an enlarged, more detailed view of the moisture extraction and steam injection embodying the invention. As illustrated, the diaphragm 50 is comprised of an inner ring 52, an outer ring 54, and a plurality of nozzles (airfoils) 56 extending therebetween. In an example embodiment of the invention, at least one moisture extraction bore 58, 60 and at least one steam injection bore 62 are defined to extend along at least a portion of the length of the airfoil 56. In an example embodiment, first and second moisture extraction bores 58, 60 are provided together with a single steam injection bore 62.

The moisture extraction bores 58, 60 and the steam injection bore 62 are each in communication at their respective radially outer ends with a diaphragm outer cavity 64 defined in the outer ring 54. In the illustrated example embodiment, the diaphragm outer cavity is configured to encourage separation of the steam and moisture for moisture collection and removal to the condenser, whereas steam can return to the steam path through the steam injection bore 62, as described in greater detail below.

The nozzle moisture extraction bore(s) 58, 60 can be in the form of a slot (open groove) or as an elongated passage having one or multiple entrance slot(s) 66 or hole(s) 68 and exit(s), as in the illustrated example embodiments. Moreover, a larger, e.g. continuous entrance cavity 70 can be communicated with the entrance slot(s) 66 or hole(s) 68 or several small entrance cavities 72 can be connected via respective holes to the extraction bore. Various non-limiting example embodiments are thus depicted in FIGS. 8-11.

Figure 8:
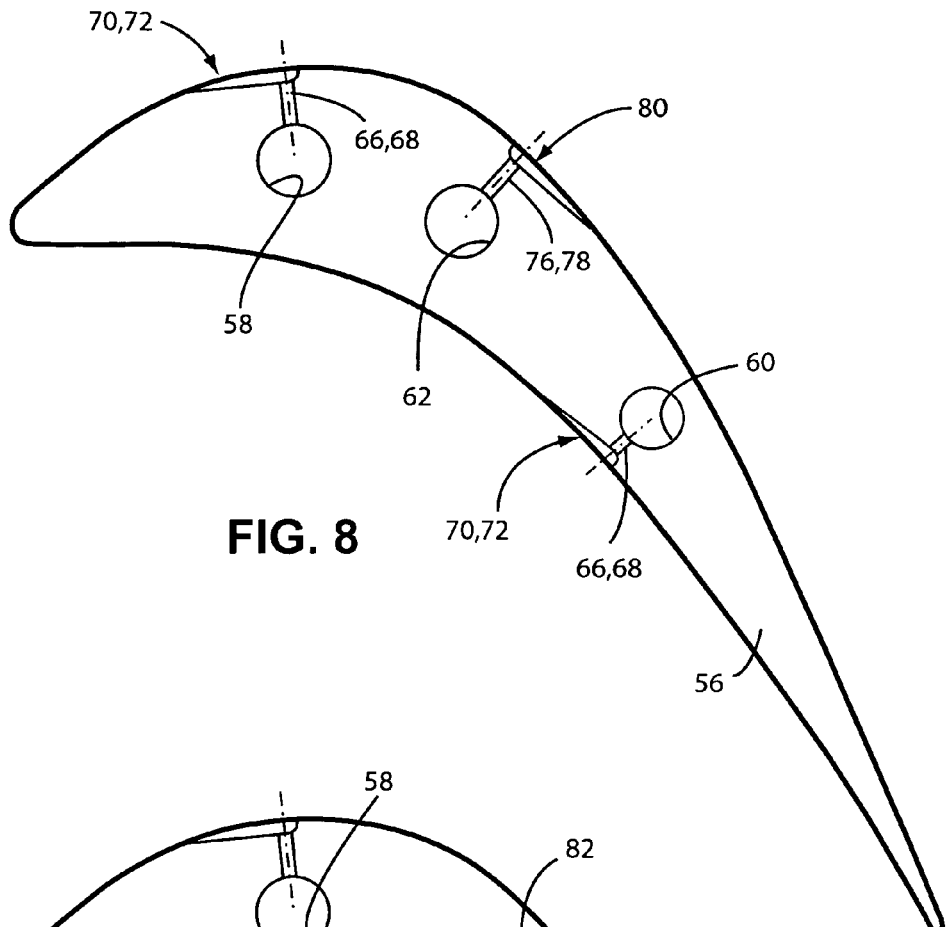
FIG. 8 is a schematic top section view of moisture removal and steam injection in an example embodiment of the invention.
Figure 10:
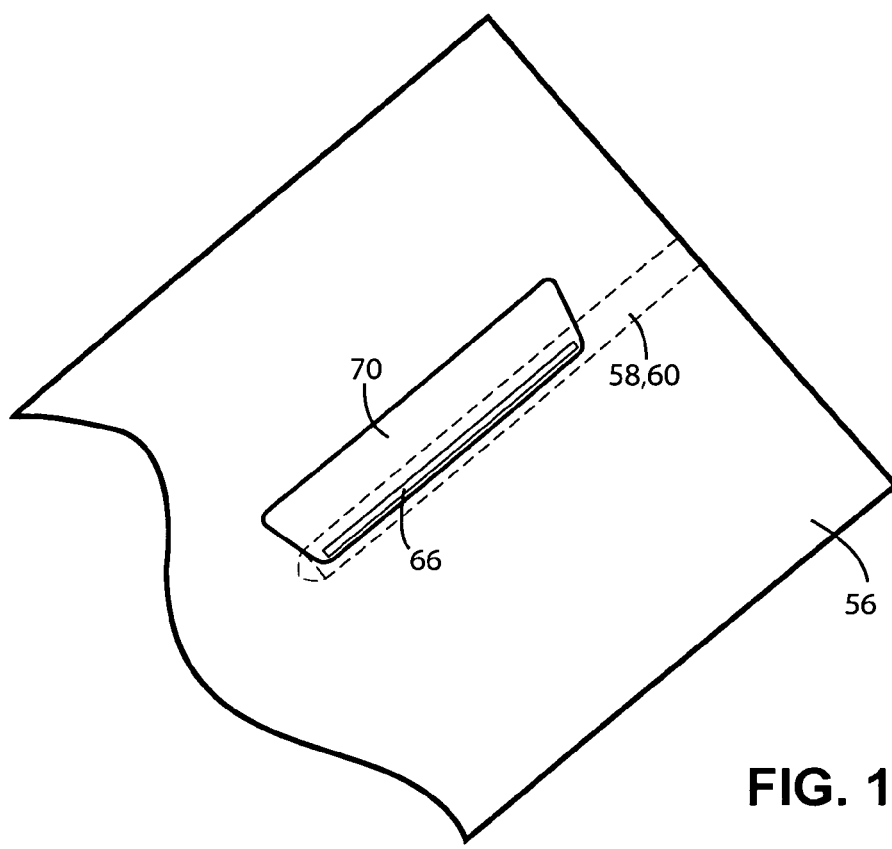
FIG. 10 is a schematic illustration of a moisture collection entrance area in an example embodiment.

Referring to FIGS. 8, and 10, the moisture extraction bore(s) 58, 60 can be provided to extend longitudinal of the airfoil with an elongated moisture entrance area or cavity defined in the surface of the nozzle to collect and direct moisture into the bore. In the embodiment illustrated in FIG. 10, the moisture extraction bore 58, 60 has an elongated slot 66 defined along at least a part of the length thereof for directing moisture collected in the entrance area 70 into the moisture extraction bore.

Figure 11:
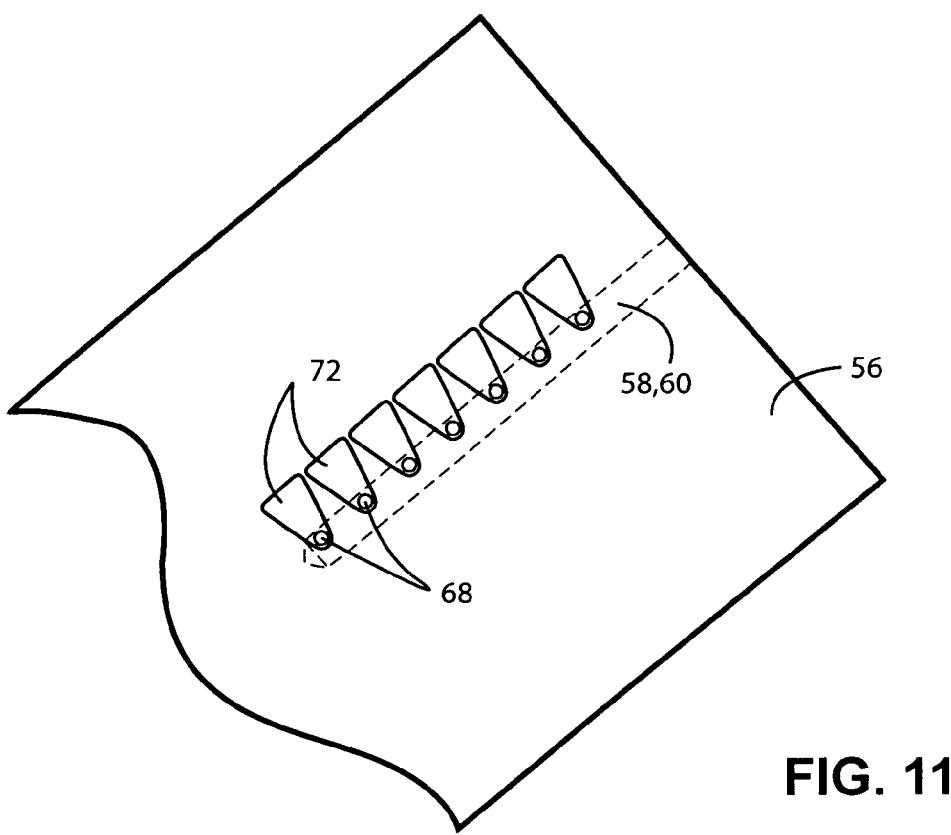
FIG. 11 is a view similar to FIG. 10 showing an alternate moisture collection entrance area.

In an alternative embodiment, illustrated in FIG. 11, a plurality of moisture removal holes 68 are communicated with the moisture extraction bore 58, 60 and each of the moisture removal holes 68 has a respective moisture entrance area or cavity 72 recessed from the surface of the airfoil, to facilitate moisture collection and to direct the same into the moisture removal hole 68 for extraction through the extraction bore 58, 60.

Figure 9:
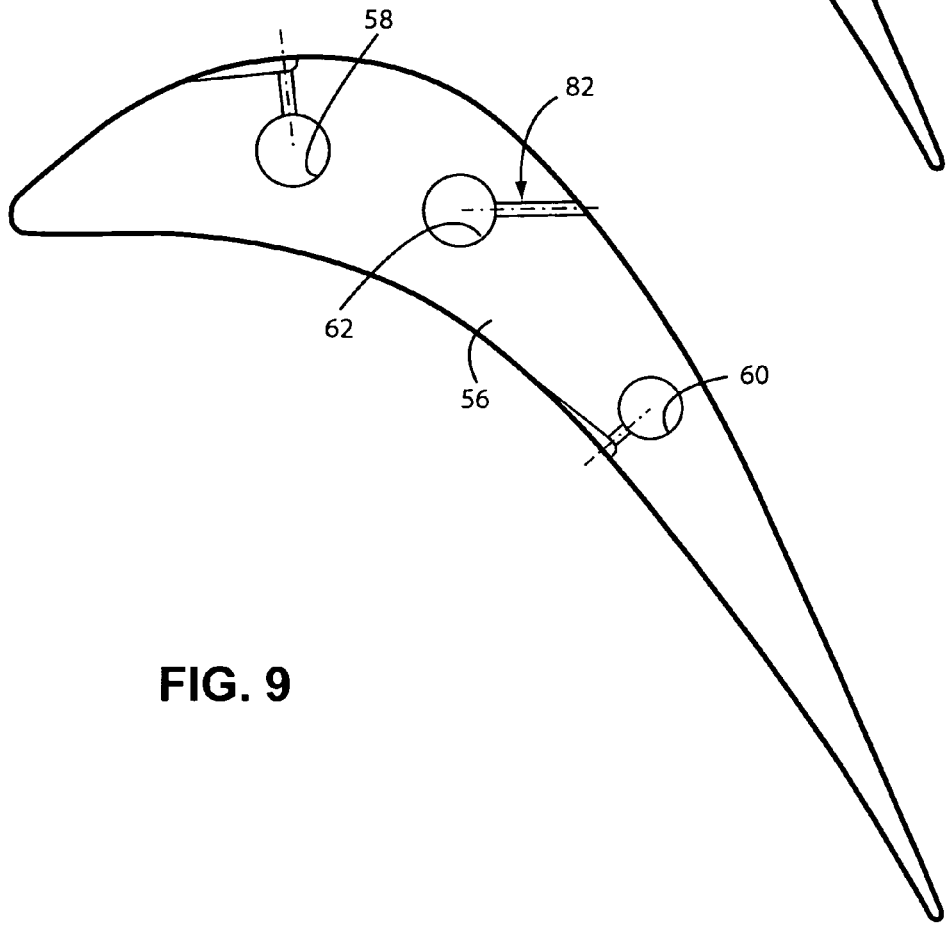
FIG. 9 is a schematic illustration of moisture extraction and steam injection according to an alternate embodiment.

The steam injection bore(s) 62 may be similarly configured. In this regard, the nozzle injection slot(s) can be simple slot(s) or hole(s) directed into the steam path at a given angle to the nozzle wall (as shown in FIG. 9). In an alternative, an injection cavity can be provided (as shown in FIG. 8) to try and use the vacuum effect flowing over a slot or cavity to lower the pressure at the exit, thereby improving the total delta pressure for the (re)injection steam. This is accomplished due to the fact that the pressure flowing around the nozzle is lowered as you move towards the trailing edge. This pressure gradient allows for steam/moisture extraction at one axial location and then (re)injection at another axial or radial location that is at a lower pressure.

More specifically, in the embodiment of FIG. 8, an elongated slot 76 or plurality of injection holes 78 are defined along the length of the steam injection bore 62. In this example embodiment the injection slot/holes are oriented generally perpendicular to the airfoil surface, although the slot/holes could be inclined in a downstream direction, and an exit cavity or cavities 80 is/are communicated with the injection slot/holes 76, 78 for using the vacuum effect mentioned above, and also for directing and flowing the injected steam along the surface of the airfoil for moisture removal and disruption. In the alternative, as illustrated in FIG. 9, the exit cavity is omitted and the injection slot/holes 82 is/are inclined so as to be directed in a downstream direction for moisture removal from the surface of the airfoil.

As mentioned above, the moisture extraction bore(s) 58, 60 lead to a diaphragm outer ring 54 circumferential cavity 64. The circumferential extraction cavity is constructed and arranged to allow steam to reenter through the nozzle injection bore(s) 62 with the moisture dropping to the lower portion of the casing cavity 64 for removal in drainage holes 84 to be directed, typically, to the condenser. In the illustrated example embodiment, there are at least two circumferential rails 86 inside the cavity 64 to maintain the moisture in the cavity and substantially preclude it from reentering the steam path through the injection bores. In this regard, as the moist steam enters the cavity it will condense on the walls and the moisture will flow basically within the given circumferential chamber and then to the bottom drain holes in the exhaust casing. The rails keep the moisture from traveling to the injection cavity 88 and even more to the actual bore(s) 62 that lead to the nozzle injection slots/holes 76, 78, 82. It is to be understood that the illustrated configuration of the circumferential extraction cavity is for example only and not to be limiting of the disclosed invention.

According to a further feature of the proposed assembly, a spoolie or a flexible connection (not shown) may be provided between the diaphragm and outer ring steam/moisture cavity and the exhaust casing (drain). This may be a more defined (sealed) cavity between the diaphragm and the casing or could be a "spoolie" that is typically used in Gas Turbine designs and Aircraft Engine designs. The connection can also be in the form of a flexible connection between the pieces, such as bellows, piston ring and pipe, or other connection.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An airfoil disposed in a row of airfoils in a steam turbine for removing moisture from a flow path of the steam turbine, wherein the airfoil has first and second longitudinal ends and an outer peripheral wall extending therebetween, said outer peripheral wall defining an airfoil leading edge, an airfoil trailing edge, a generally concave side face and a generally convex side face, at least one moisture extraction bore defined to extend along a portion of the length of said airfoil and having at least one inlet opening in flow communication with a steam path extending passed said airfoil row and between adjacent airfoils, and at least one steam injection bore defined to extend along a portion of the length of said airfoil axially downstream of at least one said moisture extraction bore and including at least one exit opening for steam injection into said steam path.

2. An airfoil as in claim 1, further comprising a steam/moisture separation cavity for receiving moisture and steam extracted through said moisture extraction bore and in flow communication with said steam injection bore for re-injecting steam separated in said cavity into said steam path.

3. An airfoil as in claim 1, wherein there are at least first and second moisture extraction bores.

4. An airfoil as in claim 1, wherein said at least one inlet opening comprises an elongated slot whereby said moisture extraction bore comprises a slot or groove along at least a portion of a length thereof in communication with said steam path.

5. An airfoil as in claim 1, wherein said at least one inlet opening comprises a plurality of discrete inlet holes communicating the steam path with the extraction bore.

6. An airfoil as in claim 1, wherein at least a portion of the nozzle surface is recessed adjacent said at least one inlet opening.

7. An airfoil as in claim 6, wherein said recess comprises an elongated cavity having a depth gradually increasing in a downstream direction for moisture collection and direction to said at least one inlet opening.

8. An airfoil as in claim 6, wherein a plurality of recesses are defined along at least a portion of the length of said extraction bore.

9. An airfoil as in claim 1, wherein said at least one exit opening for steam injection extends in a direction generally perpendicular to the surface of the airfoil.

10. An airfoil as in claim 1, wherein said at least one exit opening for steam injection extends at an angle to the surface of the airfoil so as to be directed generally in a downstream direction.

11. An airfoil as in claim 1, wherein said at least one exit opening for steam injection comprises a slot.

12. An airfoil as in claim 1, wherein said at least one exit opening for steam injection comprises a plurality of injection holes.

13. An airfoil as in claim 2, further comprising at least one radially extending rail in said cavity for substantially preventing return of moisture through the injection bore.

14. An airfoil as in claim 1, wherein said at least one exit opening for steam injection opens to the convex surface of the nozzle.

15. An airfoil as in claim 1, wherein at least one said inlet opening opens to the convex surface of the nozzle.

16. An airfoil as in claim 15, wherein said inlet opening opens to the convex surface upstream of an axial midpoint of the airfoil.

17. An airfoil as in claim 3, wherein at least one said inlet opening opens to the concave surface of the nozzle.

18. An airfoil as in claim 17, wherein said inlet opening opens on the concave side opens downstream of an axial midpoint of the airfoil.

19. A method for removing moisture from a flow path of the steam turbine, comprising:

providing at least one moisture removing airfoil in a row of airfoils of the steam turbine, the moisture removing airfoil having first and second longitudinal ends and an outer peripheral wall extending therebetween, said outer peripheral wall defining an airfoil leading edge, an airfoil trailing edge, a generally concave side face and a generally convex side face, at least one moisture extraction bore defined to extend along a portion of the length of said airfoil and having at least one inlet opening in flow communication with a steam path extending passed said airfoil row and between adjacent airfoils, and at least one steam injection bore defined to extend along a portion of the length of said airfoil axially downstream of at least one said moisture extraction bore and including at least one exit opening for steam injection into said steam path;

extracting moisture from a surface of said airfoil through said at least one moisture extraction bore; and injecting steam through said at least one steam injection bore into said steam path.

20. A method as in claim 19, wherein said at least one moisture extraction bore and said at least one steam injection bore are in respective flow communication with a steam/moisture cavity, and wherein said injecting steam comprises re-injecting steam extracted with said moisture through said at least one moisture extraction bore.

* * * * *